(12) United States Patent
Lee et al.

(10) Patent No.: US 11,523,220 B2
(45) Date of Patent: Dec. 6, 2022

(54) MEDIA PROCESSING DEVICE, MEDIA BROADCASTING SYSTEM, AND MEDIA PROCESSING METHOD

(71) Applicant: ATEN INTERNATIONAL CO., LTD., New Taipei (TW)

(72) Inventors: Yi-Kang Lee, New Taipei (TW); Yu-Lin Liu, New Taipei (TW); Ding-Yuan Wang, New Taipei (TW); Yu-Yang Lin, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 93 days.

(21) Appl. No.: 17/234,810

(22) Filed: Apr. 20, 2021

(65) Prior Publication Data
US 2021/0368268 A1      Nov. 25, 2021

(30) Foreign Application Priority Data

May 22, 2020  (TW) ................................. 109117263

(51) Int. Cl.
*H04R 5/04*      (2006.01)
*G06F 3/14*      (2006.01)
(Continued)

(52) U.S. Cl.
CPC ............. *H04R 5/04* (2013.01); *G06F 3/1446* (2013.01); *H04N 5/607* (2013.01); *H04R 5/02* (2013.01); *H04R 2499/15* (2013.01)

(58) Field of Classification Search
CPC ... H04R 5/04; H04R 3/12; H04R 5/02; H04R 2499/15; G06F 3/1446; H04S 1/007; (Continued)

(56) References Cited

U.S. PATENT DOCUMENTS 8,665,366 B2     3/2014  Lien
2008/0165992 A1*  7/2008  Kondo ................. H04N 7/0122
                                                          381/182
(Continued)

FOREIGN PATENT DOCUMENTS

CN    109274998 A    1/2019
TW    201423721 A    6/2014
TW    202006702 A    2/2020

*Primary Examiner* — Yogeshkumar Patel
(74) *Attorney, Agent, or Firm* — CKC & Partners Co., LLC (57) ABSTRACT

The present disclosure relates to a media broadcasting system, including a first broadcasting device, a second broadcasting device and a processing device. The first broadcasting device and the second broadcasting device are respectively arranged at a first side and a second side of the media broadcasting system. The processing device is electrically coupled to the first broadcasting device and the second broadcasting device, and is configured to receive a media. The processing device is configured to obtain a first channel audio signal and a second channel audio signal from the media according to a first position parameter corresponding to the first broadcasting device and a second position parameter corresponding to the second broadcasting device. The processing device is further configured to transmit the first channel audio signal to the first broadcasting device and the second channel audio signal to the second broadcasting device.

24 Claims, 8 Drawing Sheets

(51) Int. Cl.
*H04R 5/02* (2006.01)
*H04N 5/60* (2006.01)

(58) Field of Classification Search
CPC .... H04S 2400/05; H04N 5/607; H04N 5/268; H04N 21/439
See application file for complete search history.

(56) References Cited

U.S. PATENT DOCUMENTS

2014/0267638 A1\* 9/2014 Han ................... H04N 13/302
  348/51
2016/0029100 A1\* 1/2016 White ................ H04N 21/4858
  725/37

\* cited by examiner

MEDIA PROCESSING DEVICE, MEDIA BROADCASTING SYSTEM, AND MEDIA PROCESSING METHOD

CROSS-REFERENCE TO RELATED APPLICATION

This application claims priority to Taiwan Application Serial Number 109117263, filed May 22, 2020, which is herein incorporated by reference in its entirety.

BACKGROUND

Technical Field

The present disclosure relates to a media processing device, a media broadcasting system and a media processing method configured to display audio of different channels.

Description of Related Art

The current media matrix system (e.g., a multi-image display system, or a TV wall) can display dynamic images and audio through multiple display devices. However, these display devices are configured to receive the same audio signal and play all audio at the same time, which means the audio signal is not outputted based on the configuration position of these display devices and causes poor performance of the audio broadcasting. Therefore, the media system must be improved in the way it handles multi-channel situations.

SUMMARY

One aspect of the present disclosure is a media broadcasting system, comprising a first broadcasting device, a second broadcasting device and a processing device. The first broadcasting device is arranged at a first side of the media broadcasting system. The second broadcasting device is arranged at a second side of the media broadcasting system. The processing device is electrically coupled to the first broadcasting device and the second broadcasting device, and configured to receive a media. The media comprises a audio data, the processing device is configured to obtain a first channel audio signal and a second channel audio signal from the audio data according to a first position parameter corresponding to the first broadcasting device and a second position parameter corresponding to the second broadcasting device, and is further configured to transmit the first channel audio signal to the first broadcasting device and transmit the second channel audio signal to the second broadcasting device.

Another aspect of the present disclosure is a media processing method, comprising: receiving a media by a processing device, wherein the media comprises a audio data; identifying a position of a first broadcasting device and a position of a second broadcasting device according to a first position parameter and a second position parameter by the processing device; obtaining a first channel audio signal and a second channel audio signal from the audio data by the processing device; the processing device transmitting the first channel audio signal to the first broadcasting device according to the first position parameter and transmitting the second channel audio signal to the second broadcasting device according to the second position parameter.

Another aspect of the present disclosure is a media processing device, comprising an input port, an output port and a processing module. The input port is configured to receive a media, and the media comprises an audio data. The output port is configured to couple to at least one broadcasting device. The processing module is electrically coupled to the input port and the output port. The processing module is configured to obtain a first channel audio signal and a second channel audio signal from the audio data according to at least one parameter corresponding to the broadcasting device, and is configured to transmit the first channel audio signal or the second channel audio signal to the at least one broadcasting device.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments below are described in detail with the accompanying drawings, and these embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
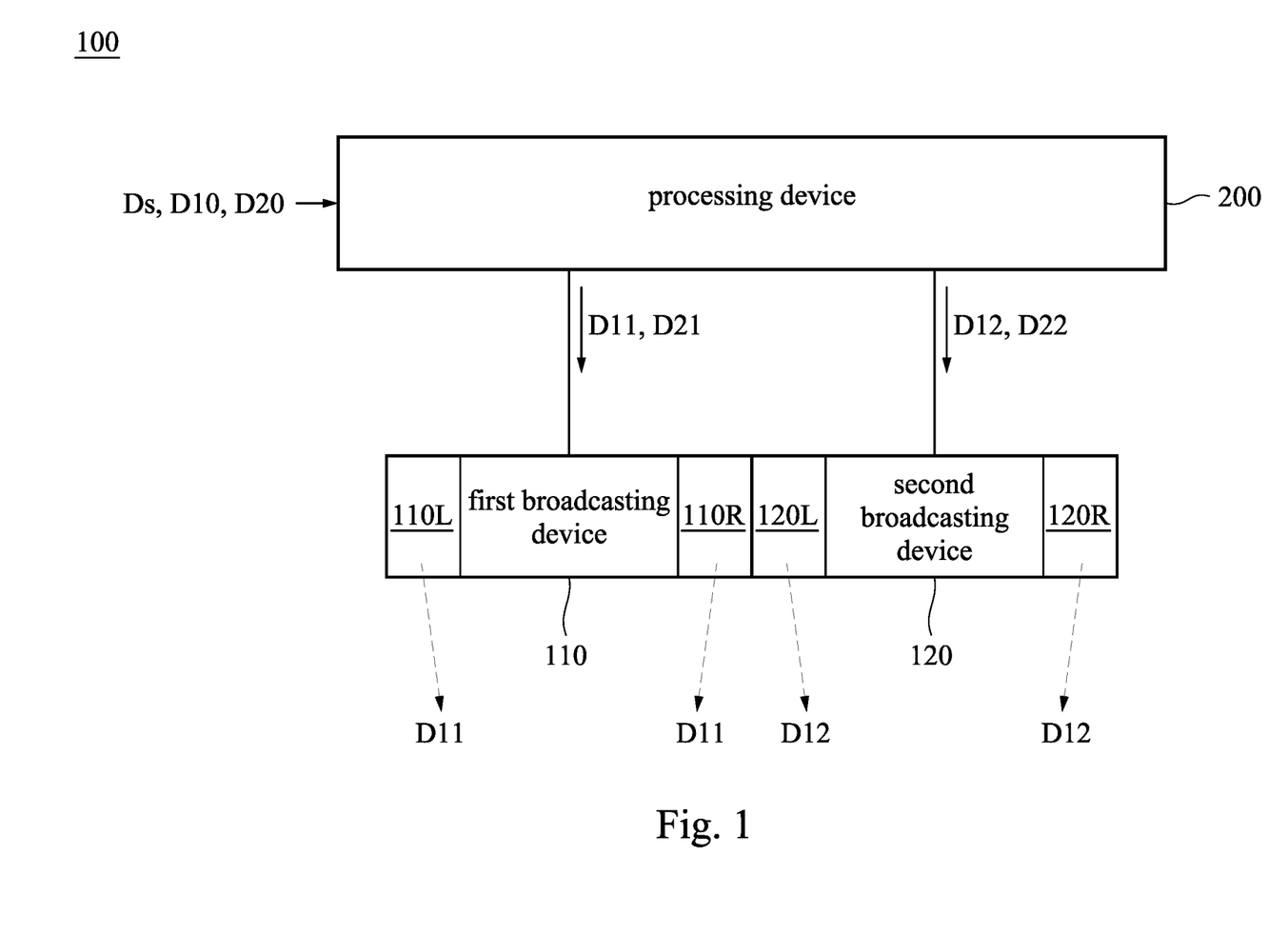
FIG. 1 is a schematic diagram of a media broadcasting system in one embodiment of the present disclosure.

FIG. 1 is a schematic diagram of a media broadcasting system 100 in one embodiment of the present disclosure. The media broadcasting system 100 includes a first broadcasting device 110, a second broadcasting device 120 and a processing device 200. The first broadcasting device 110 is arranged on the first side of the media broadcasting system 100 (e.g., the left side). The second broadcasting device 120 is arranged on the second side of the media broadcasting system 100 (e.g., the right side). In one embodiment, the first broadcasting device 110 and the second broadcasting device 120 are display devices (e.g., a display panel) configured to display video and audio. In some other embodiments, the first broadcasting device 110 and the second broadcasting device 120 may be speakers arranged on the display device, and are configured to broadcast audio.

The processing device 200 may be implemented in or implement by a central processing unit (CPU), a System on Chip (SoC), an application processor, or a server with specific functions. The processing device 200 is electrically coupled to the first broadcasting device 110 and the second broadcasting device 120. The processing device 200 confirms the relative position (e.g., right or left) of the first broadcasting device 110 and the second broadcasting device 120 according to the first position parameter corresponding to the first broadcasting device 110 and the second position parameter corresponding to the second broadcasting device 120. The method of obtaining the first position parameter and the second position parameter will be explained in the detail later.

The processing device 200 is configured to receive media Ds. For example, transmitting data through a transmission line or the Internet. The media Ds maybe provided from a server, a storage unit (e.g., flash drive) or other electronic device. In one embodiment, the media Ds includes an audio data D10. When the processing device 200 receives the media Ds, the processing device 200 bases on a first position parameter and a second position parameter to obtain a first channel audio signal D11 and a second channel audio signal D12 from the audio data D10, and thereafter transmits the first channel audio signal D11 to the first broadcasting device 110, transmits the second channel audio signal D12 to the second broadcasting device 120.

Therefore, since the processing device 200 respectively transmits audio from different channels according to positions of the first broadcasting device 110 and the second broadcasting device 120, the audio broadcast performance will be more stereo, and the situational effect of the audio channel will be improved. For example, the first channel audio signal D11 may be the left channel, and the second channel audio signal D12 may be the right channel. The processing device 200 refers to position parameters to determine the positions of each of the broadcasting devices 110, 120, so that the first broadcasting device 110 arranged on the left side broadcasts the left channel audio, and the second broadcasting device 120 arranged on the right side broadcasts the right channel audio. As shown in FIG. 1, even the first broadcasting device 110 has two speaks 110L, 110R, the two speakers 110L, 110R are configured to broadcast the same first channel audio signal D11 by the controlling of the processing device 200. Similarly, the two speakers 120L, 120R of the second broadcasting device 120 are configured to broadcasts the same second channel audio signal D12.

In another embodiment, the media Ds further includes a video data D20, such as the frame information. The first broadcasting device 110 and the second broadcasting device 120 receive the video data D20 through the processing device 200, so as to display the corresponding image frame. In some embodiments, the processing device 200 is further configured to refer to the first position parameter and the second position parameter to obtain a first position video signal D21 and a second position video signal D22 from the video data D20 accordingly, so as to transmit the first position video signal D21 to the first broadcasting device 110, and transmit the second position video signal D22 to the second broadcasting device 120. For example, the first position video signal D21 and the second position video signal D22 may be the left part and the right part of a full image, respectively. The first broadcasting device 110 and the second broadcasting device 120 are configured to display the left part and the right part of the image respectively and the combination of the two parts results the full image.

In FIG. 1, the first broadcasting device 110 has two speakers 110L, 110R arranged on the left side and the right side respectively. The second broadcasting device 120 also has two speakers 120L, 120R arranged on the left side and the right side respectively. However, the arrangement of the speakers is not limited to that shown in FIG. 1. In some other embodiments, the first broadcasting device 110 may respectively include independent display and speakers, and the display and speakers are respectively connected to the processing device 200. In some other embodiments, the speakers can be installed inside, behind or under the broadcasting device.

Figure 2A:
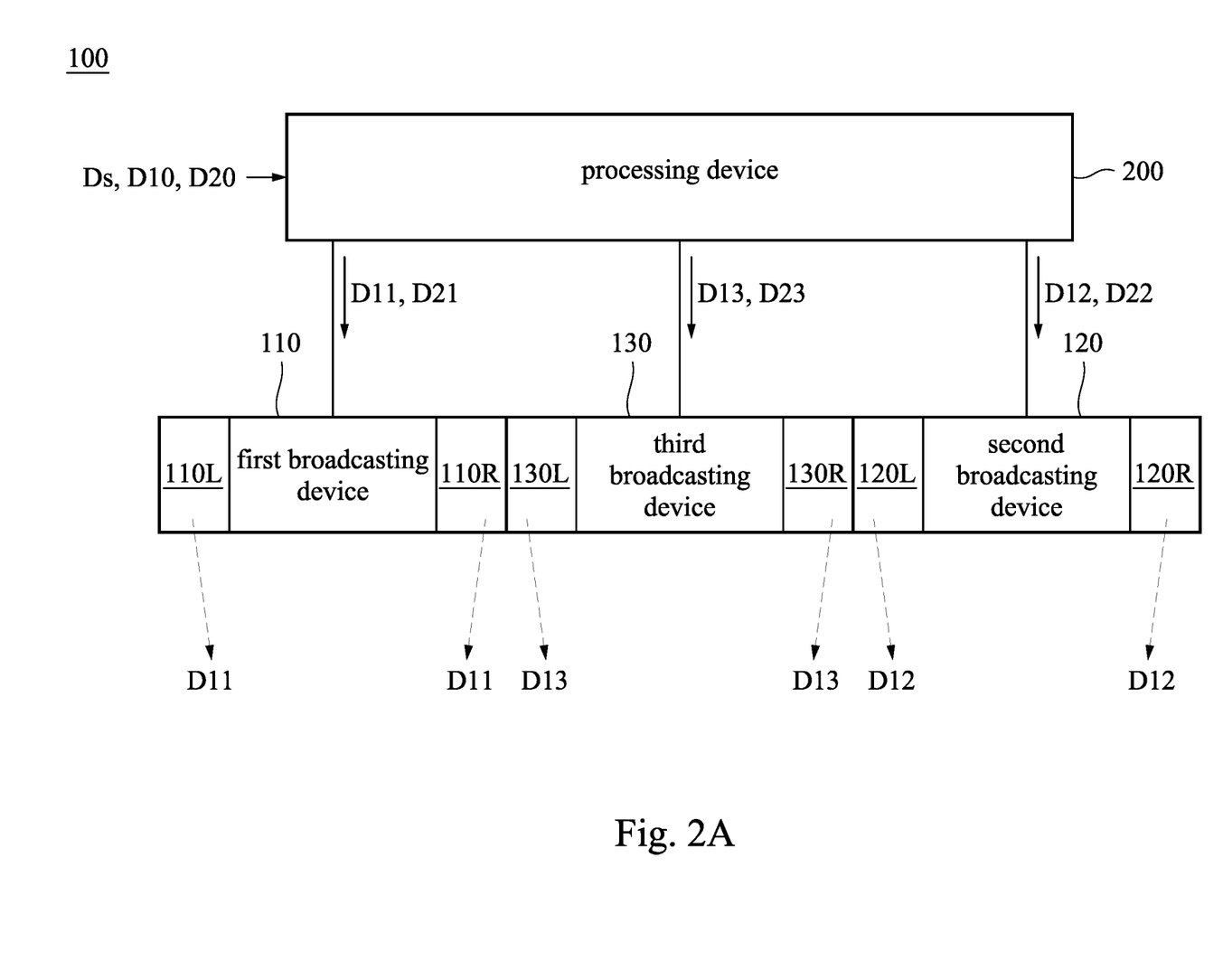
FIG. 2A is a using status schematic diagram of a media broadcasting system in another embodiment of the present disclosure.

Referring to FIG. 2A, in one embodiment, the media broadcasting system 100 further includes a third broadcasting device 130. The third broadcasting device 130 is arranged between the first broadcasting device 110 and the second broadcasting device 120. The processing device 200 is configured to obtain a subwoofer audio signal D13 from the audio data D10, and transmit the subwoofer audio signal D13 to the third broadcasting device 130 according to the third position parameter corresponding to the third broadcasting device 130. In other words, in this embodiment, the third broadcasting device 130 arranged in the center will be used exclusively to broadcast the subwoofer audio signal D13.

Figure 2B:
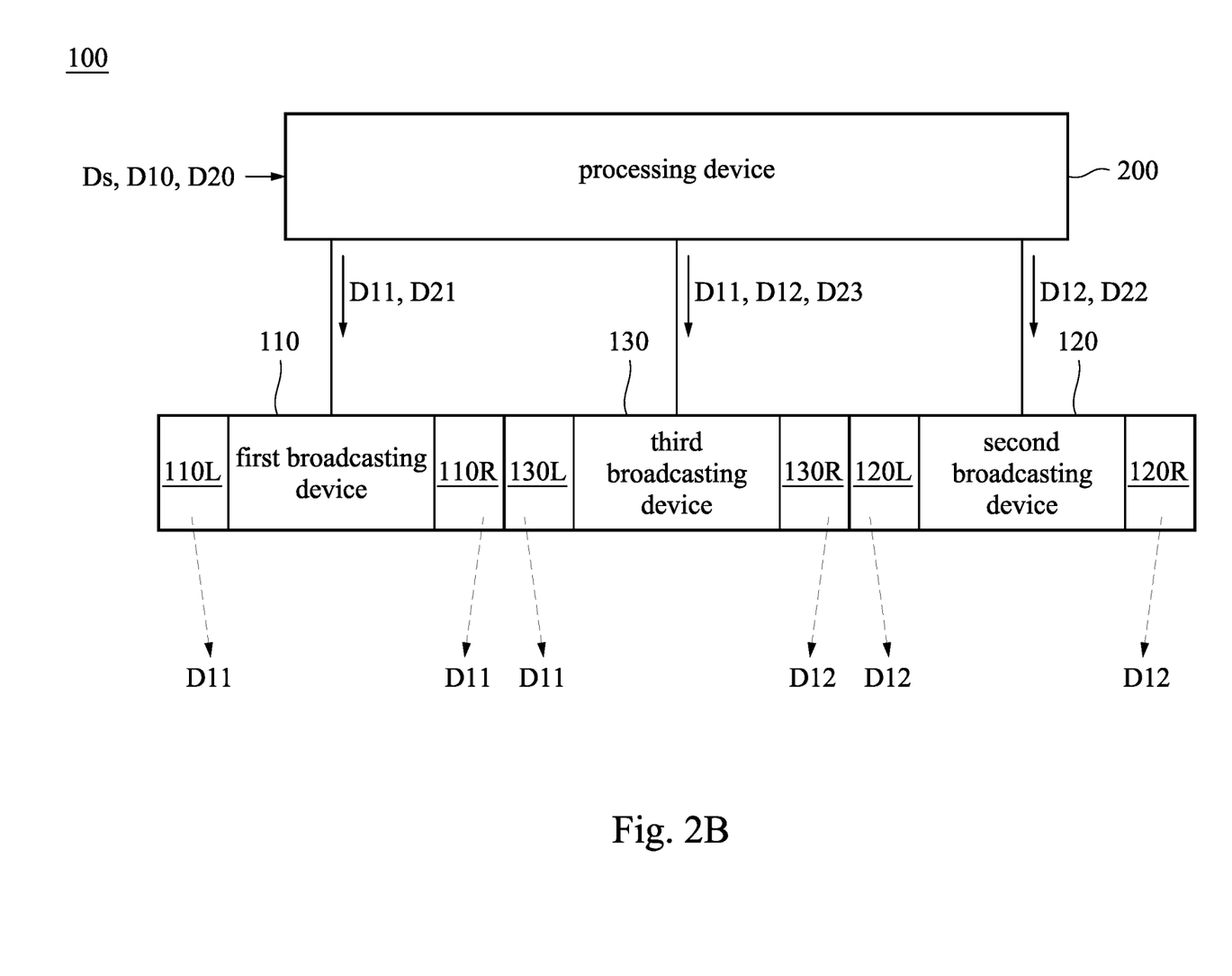
FIG. 2B is a using status schematic diagram of a media broadcasting system in another embodiment of the present disclosure.

In another embodiment, the processing device 200 is not configured to transmit the subwoofer audio signal D13 to the third broadcasting device 130. Referring to FIG. 2B, the third broadcasting device 130 includes a first channel speaker 130L and a second channel speaker 130R. The processing device 200 transmits the first channel audio signal D11 to the first channel speaker 130L, and transmits the second channel audio signal D12 to the second channel speaker 130R, so as to enhance the stereo effect of the first channel audio signal D11 and the second channel audio signal D12. In this embodiment, the position parameters (e.g., left channel, right channel) corresponding to the first channel speaker 130L and the second channel speaker 130R are set in the third broadcasting device 130, so the processing device 200 determines the relative positions of the first channel speaker 130L and the second channel speaker 130R.

Figure 2C:
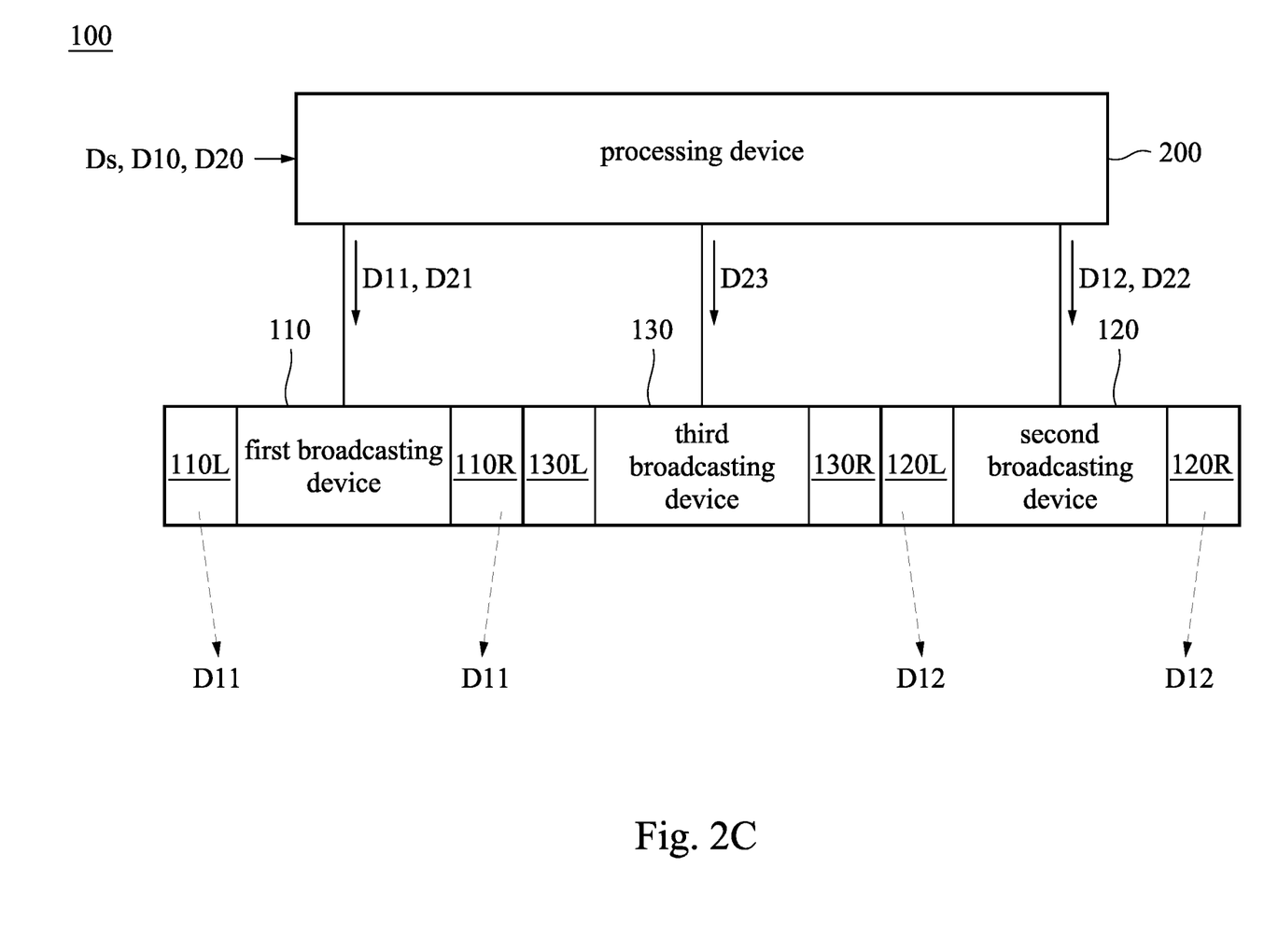
FIG. 2C is a using status schematic diagram of a media broadcasting system in another embodiment of the present disclosure.

In another embodiment, the processing device 200 is not configured to transmit the subwoofer audio signal D13 to the third broadcasting device 130. Referring to FIG. 2C, when the processing device 200 transmits the first channel audio signal D11 to the first broadcasting device 110, and transmits the second channel audio signal D12 to the second broadcasting device 120, the processing device 200 is further configured to turn off the first channel speaker 130L and the second channel speaker 130R of the third broadcasting device 130. In this embodiment, the processing device 200 transmits the video data D20 to the third broadcasting device 130, so that the third broadcasting device 130 is merely configured to display the image, and does not broadcast audio.

In the aforementioned embodiments with three broadcasting devices, the processing device 200 obtains a the third position video signal D23 from the video data D20 according to a third position parameter, so as to transmit the third position video signal D23 to the third broadcasting device 130. For example, the third position video signal D23 may be a middle part of a full image, so the first broadcasting device 110, the second broadcasting device 120 and the third broadcasting device 130 may be integrated to display the complete full image.

Figure 2D:
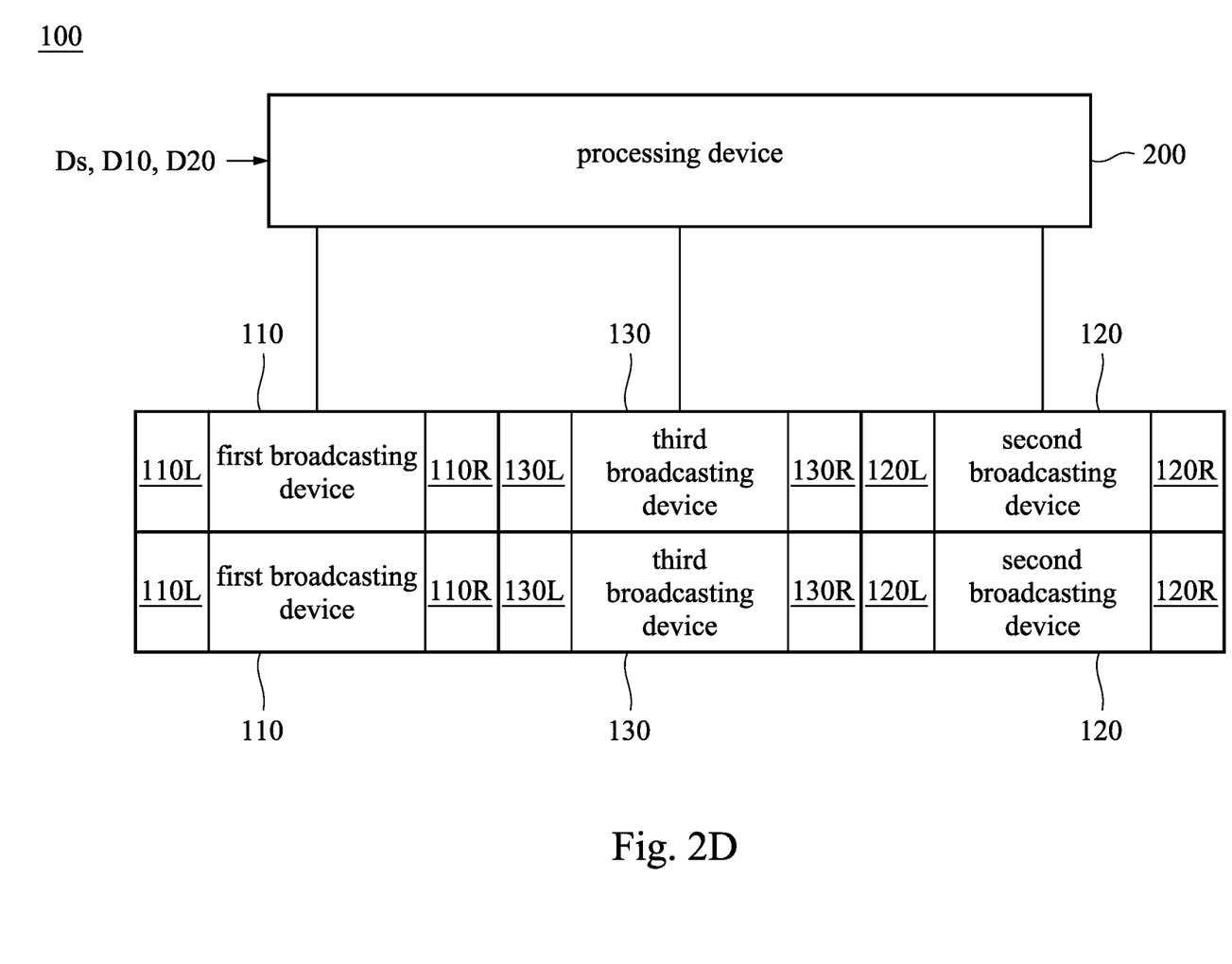
FIG. 2D is a using status schematic diagram of a media broadcasting system in another embodiment of the present disclosure.

In another embodiment, referring to FIG. 2D, the media broadcasting system 100 includes multiple first broadcasting devices 110, multiple second broadcasting devices 120 and multiple third broadcasting devices 130. The third broadcasting devices 130 are arranged between the first broadcasting device 110 and the second broadcasting device 120, and are stacked vertically. As shown in embodiments in FIG. 2A-FIG. 2C, the processing device 200 may transmit the subwoofer audio signal D13 to the third broadcasting device 130, or may respectively transmit the first channel audio signal D11 and the second channel audio signal D12 to the first channel speaker 130L and the second channel speaker 130R. Similarly, the processing device 200 may turn off the first channel speaker 130L and the second channel speaker 130R of the third broadcasting device 130.

Figure 3:
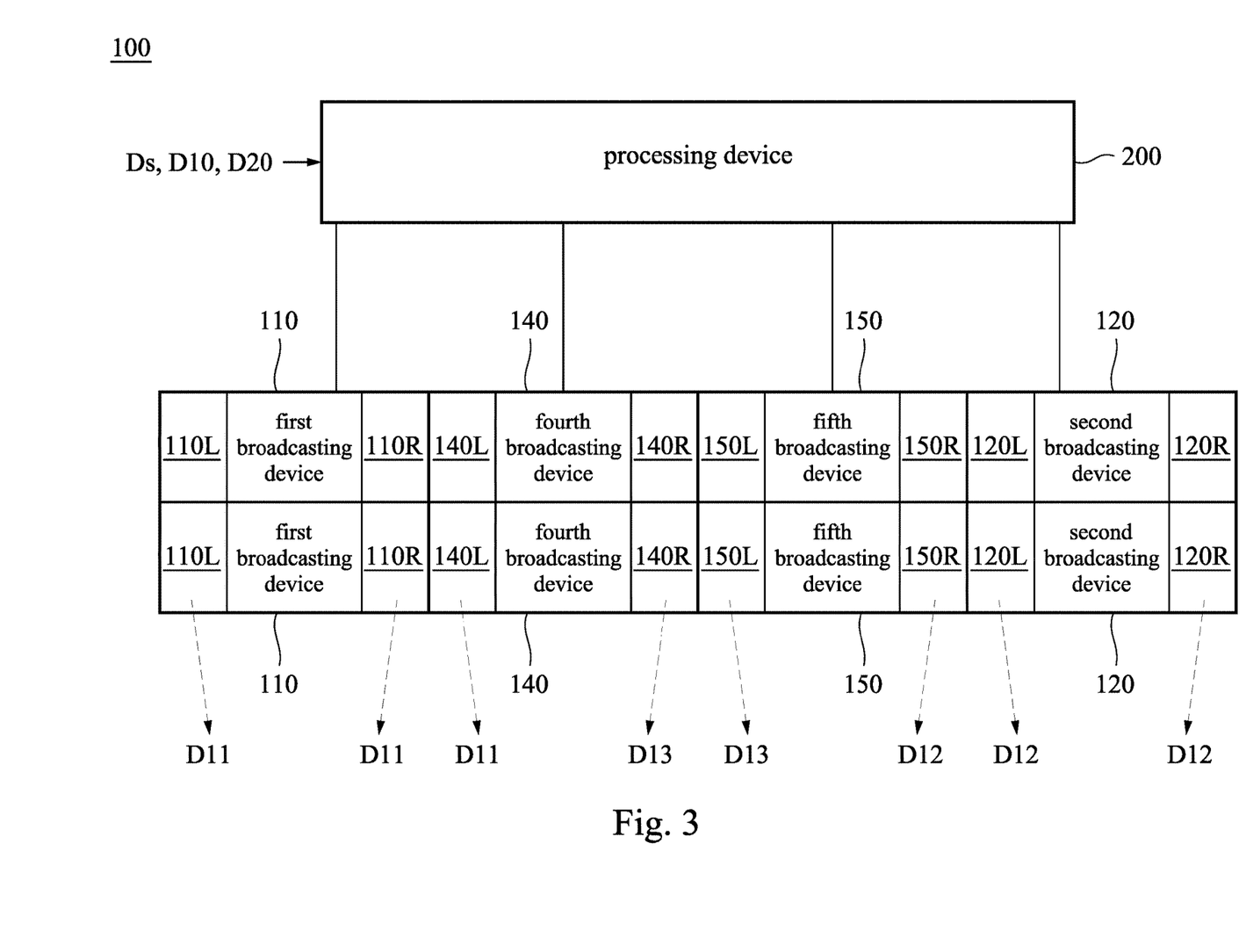
FIG. 3 is a schematic diagram of a media broadcasting system in another one of the embodiments of the present disclosure.

Referring to FIG. 3, FIG. 3 is a schematic diagram of multiple broadcasting devices arranged between the first broadcasting device 110 and the second broadcasting device 120 in some embodiments of the present disclosure. In FIG. 3, the similar components associated with the embodiment of FIG. 1 are labeled with the same numerals for ease of understanding. The specific principle of the similar component has been explained in detail in the previous paragraphs, and unless it has a cooperative relationship with the components of FIG. 3, it is not repeated here.

In one embodiment, the media broadcasting system 100 further includes a fourth broadcasting device 140 and a fifth broadcasting device 150. The broadcasting devices 110, 120, 140, 150 arranged in horizontal or vertical direction, and the processing device 200 may store multiple position parameters corresponding to the broadcasting devices 110, 120, 140, 150. The fourth broadcasting device 140 is arranged between the first broadcasting device 110 and the second broadcasting device 120, and is adjacent to the first broadcasting device 110. The fourth broadcasting device 140 includes a third channel speaker 140L and a fourth channel speaker 140R. The fifth broadcasting device 150 is arranged between the first broadcasting device 110 and the second broadcasting device 120, and is adjacent to the second broadcasting device 120. The fifth broadcasting device 150 includes a fifth channel speaker 150R and a sixth channel speaker 150L.

The fourth broadcasting device 140 stores position parameters of speakers configured to indicate the relative positions of the third channel speaker 140L and the fourth channel speaker 140R on the fourth broadcasting device 140. Similarly, the fifth broadcasting device 150 stores position parameters configured to indicate the relative positions of the fifth channel speaker 150R and the sixth channel speaker 150L on the fifth broadcasting device 150. The processing device 200 may obtain those position parameters to transmit the corresponding audio.

In another embodiment, the fourth broadcasting device 140 and the fifth broadcasting device 150 may be used to broadcast the subwoofer audio signal. When the processing device 200 transmits the first channel audio signal D11 (e.g., the left channel audio) to the first broadcasting device 110, and transmits the second channel audio signal D12 (e.g., the right channel audio) to the second broadcasting device 120, the processing device 200 is further configured to transmit the first channel audio signal D11 to the third channel speaker 140L, and transmit the second channel audio signal D12 to the fifth channel speaker 150R. Furthermore, the processing device 200 obtains the subwoofer audio signal D13 from the audio data D10, and transmits the subwoofer audio signal D13 to the fourth channel speaker 140R and the sixth channel speaker 150L to enhance the stereo effect of audio.

In another embodiment, the fourth broadcasting device 140 and the fifth broadcasting device 150 may be used to enhance the first channel audio signal D11 and the second channel audio signal D12. When the processing device 200 transmits the first channel audio signal D11 (e.g., the left channel audio) to the first broadcasting device 110, and transmits the second channel audio signal D12 (e.g., the right channel audio) to the second broadcasting device 120, the processing device 200 transmits the first channel audio signal D11 to the third channel speaker 140L, but turns off the fourth channel speaker 140R. Similarly, the processing device 200 transmits the second channel audio signal D12 to the fifth channel speaker 150R, but turns off the sixth channel speaker 150L. After adjusting the audio configuration, the same audio can be broadcasted together, so as to avoid the fourth channel speaker 140R and the sixth channel speaker 150L in the center from affecting the stereo of the audio.

Figure 4:
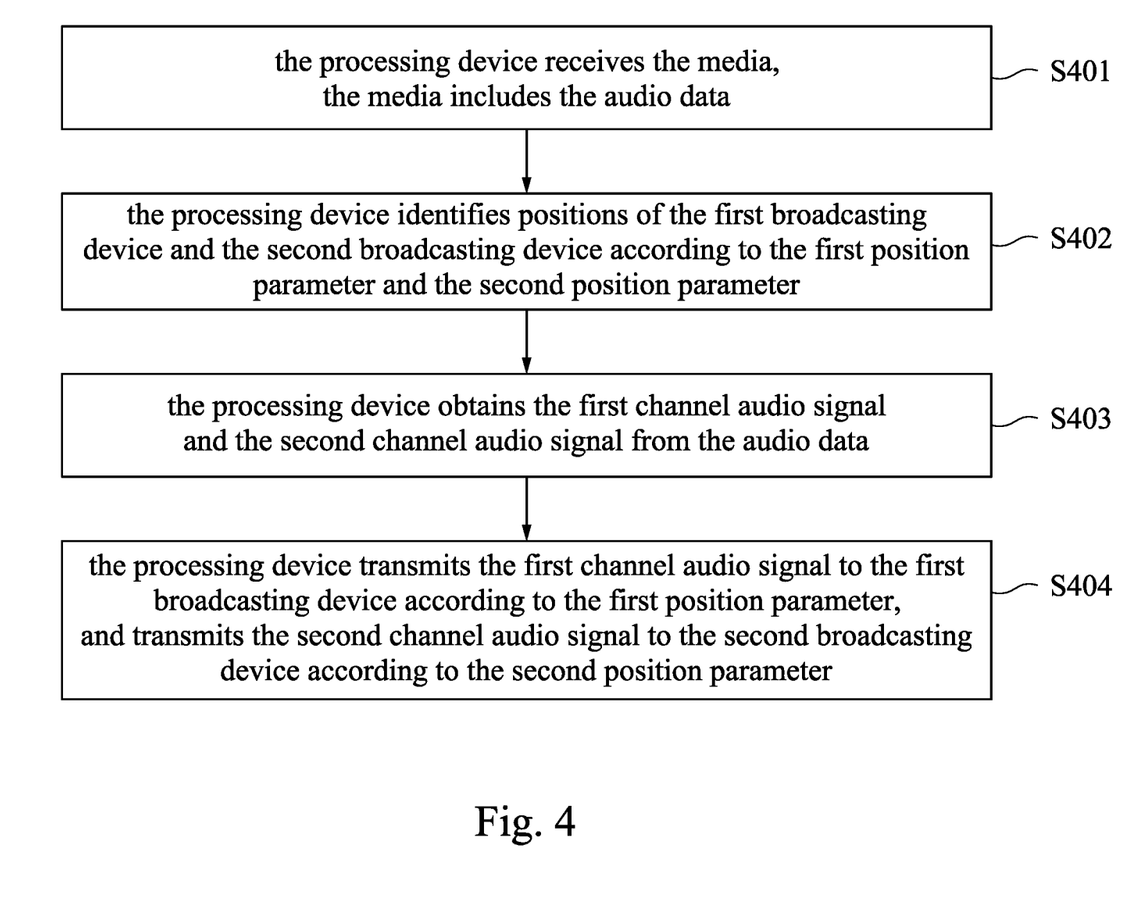
FIG. 4 is a flowchart illustrating a media processing method in one of the embodiments of the present disclosure.

Referring to FIG. 4, FIG. 4 is a flowchart illustrating a media processing method in some embodiments of the present disclosure. The media processing method includes steps S401-S404. In step S401, the processing device 200 receives the media Ds. The media Ds includes the audio data D10. In step S402, the processing device 200 identifies positions of the first broadcasting device 110 and the second broadcasting device 120 according to the first position parameter and the second position parameter. For example, the first broadcasting device 110 is arranged on the left side, and the second broadcasting device 120 is arranged on the right side.

In step S403, the processing device 200 obtains the first channel audio signal D11 and the second channel audio signal D12 from the audio data D10. The first channel audio signal D11 and the second channel audio signal D12 may be the left channel audio and the right channel audio. In step S404, the processing device 200 transmits the first channel audio signal D11 to the first broadcasting device 110 according to the first position parameter, and transmits the second channel audio signal D12 to the second broadcasting device 120 according to the second position parameter.

Further, in another embodiment of the media processing method, the media Ds received by the processing device 200 further includes the video data D20, so the processing device 200 obtains the video data D20 from the media Ds, and obtains the first position video signal D21 and the second position video signal D22 from the video data D20. Next, in step S404, the first position video signal D21 is transmitted to the first broadcasting device 110 according to the first position parameter, and, the second position video signal D22 is transmitted to the second broadcasting device 120 according to the second position parameter.

In some other embodiments, in the case that the third broadcasting device 130 is arranged between the first broadcasting device 110 and the second broadcasting device 120, when the processing device 200 performs the step S402 of the media processing method, the processing device 200 further identifies the position of the third broadcasting device 130 according to the third position parameter. Then, the subwoofer audio signal D13 is transmitted to the third broadcasting device 130, or the first channel speaker 130L and the second channel speaker 130R of the third broadcasting device 130 are turned off. Furthermore, the first channel speaker 130L and the second channel speaker 130R may be used to respectively broadcast the first channel audio signal D11 and the second channel audio signal D12.

In another embodiment, in the case that the fourth broadcasting device 140 and the fifth broadcasting device 150 are arranged between the first broadcasting device 110 and the second broadcasting device 120, when the processing device performs the media processing method, the processing device may identify positions of the fourth broadcasting device 140 and the fifth broadcasting device 150, and may control the fourth broadcasting device 140 and the fifth broadcasting device 150 to broadcast the subwoofer audio signal D13, or enhance the effect of the first channel audio signal D11 and the second channel audio signal D12. The corresponding step has been mentioned in the foregoing embodiment, so it will not be repeated here.

Figure 5:
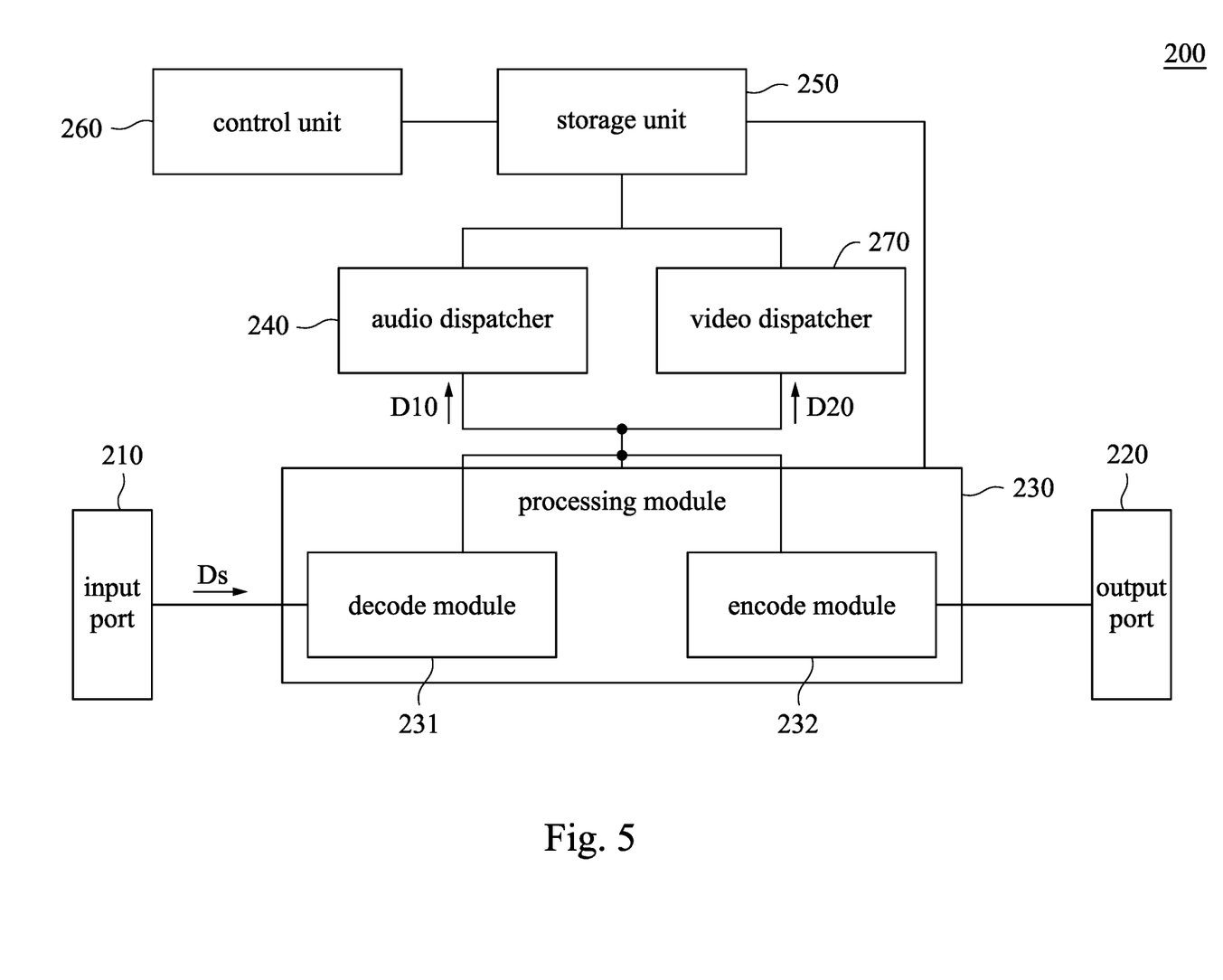
FIG. 5 is a schematic diagram of a media processing device in one of the embodiments of the present disclosure.

Referring to FIG. 5, FIG. 5 is a schematic diagram of a media processing device in some embodiments of the present disclosure. In this embodiment, the processing device 200 may be an independent media processing device. In some other embodiments, the processing device 200 may be a part of a computer or a server, and connect to multiple broadcasting devices in a wired or wireless manner.

The processing device 200 includes an input port 210, an output port 220 and a processing module 230. The input port 210 is configured to receive the media Ds. The input port 210 may be a transmission interface for receiving audio, and is configured to receive the audio data D10 from the media Ds. The input port 210 may be a transmission interface for receiving video, and is configured to receive the video file or music file. The output port 220 is configured to connect to the broadcasting device, in one embodiment, the input port 210 and the output port 220 can be an interface of the same transmission specification.

The processing module 230 is electrically coupled to the input port 210 and the output port 220, and is configured to perform multiple calculations. In one embodiment, the processing module 230 may be implement by a microcontroller, a microprocessor, a digital signal processor, an application specific integrated circuit (ASIC) or a logic circuit.

The processing module 230 is configured to receive the position parameter of the broadcasting device, and obtains the audio data D10 (e.g., the first channel audio signal D11, the second channel audio signal D12) and the video data D20 (e.g., the first position video signal D21, the second position video signal D22) according to position parameter of the corresponding broadcasting device and the video file or audio file transmitted by the input port 210, then transmits the obtained data to the broadcasting device. As shown in FIG. 1, the processing module 230 transmits the first channel audio signal D11 to the first broadcasting device 110, so as to transmit the second channel audio signal D12 to the second broadcasting device 120.

In one embodiment, the processing device 200 further includes an audio dispatcher 240 and a storage unit 250. The audio dispatcher 240 is electrically coupled to the processing module 230, so as to receive the audio data D10. The storage unit 250 is electrically coupled to the processing module 230 and the audio dispatcher 240, and is configured to store the first position parameter, the second position parameter, the adjusted audio data and the adjusted video data. The storage unit 250 may be a read-only memory, a flash memory, a hard disk, a database accessed via the network, or a storage medium with the same functions and familiar with one skilled in the art.

The first position parameter corresponds with the first broadcasting device 110, and the second position parameter corresponds to the second broadcasting device 120. For example, the first position parameter may correspond to the left channel and the left position of the media broadcasting system 100. The second position parameter may correspond to the right channel and the right position of the media broadcasting system 100. Further, the first broadcasting device 110 and the second broadcasting device 120 may be different display devices, or the first broadcasting device 110 and the second broadcasting device 120 may be speakers arranged on the same display device.

In one embodiment, the audio dispatcher 240 obtains the first channel audio signal D11 and the second channel audio signal D12 from the audio data D10 according to the first position parameter and the second position parameter. The audio dispatcher 240 transmits the first channel audio signal D11 and the first position parameter to the processing module 230, and transmits the second position parameter and the second channel audio signal D12 to the processing module 230, so that the processing module 230 transmits the first channel audio signal D11 to the first broadcasting device 110, and transmits the second channel audio signal D12 to the second broadcasting device 120.

In another embodiment, the audio dispatcher receives the audio data D10 from the processing module 230, and obtains the first channel audio signal D11 and the second channel audio signal D12 from it, then transmits the first channel audio signal D11 and the second channel audio signal D12 to the processing module 230, so that the processing module 230 transmits the first channel audio signal D11 to the first broadcasting device 110 according to the first position parameter and the second position parameter, and transmits the second channel audio signal D12 to the second broadcasting device 120.

The following explains the way to obtain the position parameter. In one embodiment, the processing device 200 further includes a control unit 260. The control unit 260 is electrically coupled to the processing module 230, and is configured to connect an user operation device (e.g., a display panel with touch function, or an electronic device with a display panel configured to display the operation interface). The user may input position information according to the configuration of the broadcasting devices, so that the user operation device generates the corresponding position parameters. The control unit 260 is configured to receive position parameters, and stores position parameters to the storage unit 250. In this embodiment, the channel audio signal required by each broadcasting device corresponding to each position parameter can be dynamically adjusted according to user needs. In some other embodiments, the processing device 200 further has multiple sensors configured to automatically detect positions of broadcasting devices. For example, when the first broadcasting device 110 connects to the output port 220, and is arranged to the front of the processing device 200, the sensor may detect that the first broadcasting device 110 is arranged on the left side. Next, the second broadcasting device 120 connects to the output port 220, and is arranged to the front of the processing device 200, the sensor may detect that the second broadcasting device 120 is arranged on the right side. In this embodiment, the channel audio signal required by the broadcasting device corresponding to each position parameter can be automatically adjusted to meet the expected broadcasting effect of the user.

As shown in FIG. 5, in one embodiment, the processing device 200 further includes a video dispatcher 270. The video dispatcher 270 is electrically coupled to the processing module 230 and the storage unit 250, so as to obtain the video data D20, the first position parameter and the second position parameter. The video dispatcher 270 obtains the first position video signal D21 and the second position video signal D22 from the video data D20 according to the first position parameter and the second position parameter, so that the processing module 230 transmit the first position video signal D21 to the first broadcasting device 110, and transmits the second position video signal D22 to the second broadcasting device 120 (as shown in FIG. 1).

Similarly, if the third broadcasting device 130 is arranged between the first broadcasting device 110 and the second broadcasting device 120, and the storage unit 250 stores the third position parameter corresponding to the position of the third broadcasting device 130, the video dispatcher 270 obtains the third position video signal from the video data D20 according to the third position parameter, and transmits the third position video signal to the third broadcasting device.

In one embodiment, the audio dispatcher 240 obtains the subwoofer audio signal D13 from the audio data D10 according to the third position parameter, and transmit the subwoofer audio signal D13 to the processing module 230, so that the processing module 230 transmits the subwoofer audio signal D13 to the third broadcasting device 130 (as shown in FIG.2A). In another embodiment, the audio dispatcher 240 receives the audio data D10 from the processing module 230, and obtains the subwoofer audio signal D13 from it, then transmits the subwoofer audio signal D13 to the processing module 230, so that the processing module 230 transmits the subwoofer audio signal D13 to the third broadcasting device 130 according to the third position parameter.

In some other embodiments, if the third broadcasting device 130 includes the first channel speaker 130L and the second channel speaker 130R, the audio dispatcher 240 may transmit the first channel audio signal D11 and the second channel audio signal D12 to the processing module 230 according to the third position parameter. The processing module 230 is configured to transmit the first channel audio signal D11 to the first channel speaker 130L, and is configured to transmit the second channel audio signal D12 to the second channel speaker 130R, so as to enhance the audio broadcasting performance, as shown in FIG. 2B.

In some other embodiments, when the processing module 230 transmits the first channel audio signal D11 to the first broadcasting device 110, and transmits the second channel audio signal D12 to the second broadcasting device 120, the processing module 230 is further configured to turn off speakers of the third broadcasting device 130, as shown in FIG. 2C.

Furthermore, as mentioned in the above embodiment, in the case that the fourth broadcasting device 140 and the fifth broadcasting device 150 are arranged between the first broadcasting device 110 and the second broadcasting device 120, the processing module 230 transmits the first channel audio signal D11 to the third channel speaker 140L of the fourth broadcasting device 140, and transmit the second channel audio signal D12 to the fifth channel speaker 150R of the fifth broadcasting device 150. At the same time, the processing module 230 is configured to transmit the subwoofer audio signal D13 to the fourth channel speaker 140R of the fourth broadcasting device 140 and the sixth channel speaker 150L of the fifth broadcasting device 15. Otherwise, the processing module 230 may turns off the fourth channel speaker 140R of the fourth broadcasting device 140 and the sixth channel speaker 150L of the fifth broadcasting device 150.

In one embodiment, the processing module 230 further includes a decode module 231 and a encode module 232. The decode module 231 is configured to receive the media Ds, and convert the media Ds into a format readable by the processing module 230. The decode module 231 is further configured to transmit the audio data D10 of the media Ds to the audio dispatcher 240, and transmit the video data D20 of the media Ds to the video dispatcher 270. The encode module 232 is electrically coupled to the audio dispatcher 240 and the video dispatcher 270, is configured to receive multiple channel audio signals, the subwoofer audio signal or multiple position video signals. The encode module 232 is configured to encode the receive data to a format readable by broadcasting devices, so as to transmit to the broadcasting devices.

As mentioned above, the media processing device, the media broadcasting system and the media processing method of the present disclosure may divide the audio data into multiple audio signals of different channels through multiple position parameters corresponding to multiple broadcasting devices, and then transmit the audio signals to the broadcasting devices corresponding to the position parameters. Accordingly, In the case of multiple broadcasting devices (a TV wall composed of multiple panels), the audio broadcast method of each broadcasting device will be automatically adjusted according to the position to meet the expected sound channel effect from the user, and the audio has a better stereo and space effect.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A media broadcasting system, comprising:
    a first broadcasting device arranged at a first side of the media broadcasting system;
    a second broadcasting device arranged at a second side of the media broadcasting system; and
    a processing device electrically coupled to the first broadcasting device and the second broadcasting device, and configured to receive a media, wherein the media comprises an audio data, the processing device is configured to obtain a first channel audio signal and a second channel audio signal from the audio data according to a first position parameter corresponding to the first broadcasting device and a second position parameter corresponding to the second broadcasting device, and is further configured to transmit the first channel audio signal to the first broadcasting device and transmit the second channel audio signal to the second broadcasting device.

2. The media broadcasting system of claim 1, wherein the media further comprises a video data, and the processing device is further configured to obtain a first position video signal and a second position video signal from the video data according to the first position parameter and the second position parameter, so as to transmit the first position video signal to the first broadcasting device and transmit the second position video signal to the second broadcasting device.

3. The media broadcasting system of claim 1, further comprising:
a third broadcasting device arranged between the first broadcasting device and the second broadcasting device, wherein the processing device is configured to obtain a subwoofer audio signal from the audio data according to a third position parameter, and is configured to transmit the subwoofer audio signal to the third broadcasting device.

4. The media broadcasting system of claim 1, further comprising:
a third broadcasting device arranged between the first broadcasting device and the second broadcasting device, wherein when the processing device transmits the first channel audio signal to the first broadcasting device, and transmits the second channel audio signal to the second broadcasting device, the processing device is further configured to turn off a speaker in the third broadcasting device.

5. The media broadcasting system of claim 1, further comprising:
a third broadcasting device arranged between the first broadcasting device and the second broadcasting device, and comprising a first channel speaker and a second channel speaker, wherein the processing device transmits the first channel audio signal to the first channel speaker, and transmits the second channel audio signal to the second channel speaker.

6. The media broadcasting system of claim 1, further comprising:
a fourth broadcasting device arranged between the first broadcasting device and the second broadcasting device, adjacent to the first broadcasting device, and comprising a third channel speaker and a fourth channel speaker; and
a fifth broadcasting device arranged between the first broadcasting device and the second broadcasting device, adjacent to the second broadcasting device, and comprising a fifth channel speaker and a sixth channel speaker, wherein the processing device transmits the first channel audio signal to the third channel speaker, and transmits the second channel audio signal to the fifth channel speaker; the processing device further obtains a subwoofer audio signal from the audio data, and transmits the subwoofer audio signal to the fourth channel speaker and the sixth channel speaker.

7. The media broadcasting system of claim 1, further comprising:
a fourth broadcasting device arranged between the first broadcasting device and the second broadcasting device, adjacent to the first broadcasting device, and comprising a third channel speaker and a fourth channel speaker, and
a fifth broadcasting device arranged between the first broadcasting device and the second broadcasting device, adjacent to the second broadcasting device, and comprising a fifth channel speaker and a sixth channel speaker, wherein the processing device transmits the first channel audio signal to the third channel speaker, and turns off the fourth channel speaker; the processing device further transmits the second channel audio signal to the fifth channel speaker, and turns off the sixth channel speaker.

8. A media processing method, comprising:
receiving a media by a processing device, wherein the media comprises an audio data;
identifying a position of a first broadcasting device and a position of a second broadcasting device according to a first position parameter and a second position parameter;
obtaining a first channel audio signal and a second channel audio signal from the audio data;
transmitting the first channel audio signal to the first broadcasting device according to the first position parameter; and
transmitting the second channel audio signal to the second broadcasting device according to the second position parameter.

9. The media processing method of claim 8, further comprising:
obtaining a video data from the media, wherein the video data comprises a first position video signal and a second position video signal;
transmitting the first position video signal to the first broadcasting device according to the first position parameter; and
transmitting the second position video signal to the second broadcasting device according to the second position parameter.

10. The media processing method of claim 8, further comprising:
identifying a position of a third broadcasting device according to a third position parameter, wherein the third broadcasting device is arranged between the first broadcasting device and the second broadcasting device;
obtaining a subwoofer audio signal from the audio data; and
transmitting the subwoofer audio signal to the third broadcasting device according to the third position parameter.

11. The media processing method of claim 8, further comprising:
identifying a position of a third broadcasting device according to a third position parameter, wherein the third broadcasting device is arranged between the first broadcasting device and the second broadcasting device; and
turning off a speaker in the third broadcasting device when the processing device transmits the first channel audio signal to the first broadcasting device and transmits the second channel audio signal to the second broadcasting device.

12. The media processing method of claim 8, further comprising:
identifying a position of a third broadcasting device according to a third position parameter, wherein the third broadcasting device is arranged between the first broadcasting device and the second broadcasting device, and comprises a first channel speaker and a second channel speaker; and
transmitting the first channel audio signal to the first channel speaker, and transmitting the second channel audio signal to the second channel speaker.

13. The media processing method of claim 8, further comprising:
arranging a fourth broadcasting device between the first broadcasting device and the second broadcasting device, and adjacent to the first broadcasting device, wherein the fourth broadcasting device comprises a third channel speaker and a fourth channel speaker; and arranging a fifth broadcasting device between the first broadcasting device and the second broadcasting device, and adjacent to the second broadcasting device, wherein the fifth broadcasting device comprises a fifth channel speaker and a sixth channel speaker; the processing device transmits the first channel audio signal to the third channel speaker, and transmits the second channel audio signal to the fifth channel speaker; the processing device further obtains a subwoofer audio signal from the audio data, and transmits the subwoofer audio signal to the fourth channel speaker and the sixth channel speaker.

14. The media processing method of claim 8, further comprising:
arranging a fourth broadcasting device between the first broadcasting device and the second broadcasting device, and adjacent to the first broadcasting device, wherein the fourth broadcasting device comprises a third channel speaker and a fourth channel speaker; and
arranging a fifth broadcasting device between the first broadcasting device and the second broadcasting device, and adjacent to the second broadcasting device, wherein the fifth broadcasting device comprises a fifth channel speaker and a sixth channel speaker; the processing device transmits the first channel audio signal to the third channel speaker, and turns off the fourth channel speaker; the processing device further transmits the second channel audio signal to the fifth channel speaker, and turns off the sixth channel speaker.

15. A media processing device, comprising:
an input port configured to receive a media, wherein the media comprises an audio data;
an output port configured to couple to at least one broadcasting device; and
a processing module electrically coupled to the input port and the output port, wherein the processing module is configured to obtain a first channel audio signal and a second channel audio signal from the audio data according to at least one position parameter corresponding to the at least one broadcasting device, and is configured to transmit the first channel audio signal or the second channel audio signal to the at least one broadcasting device.

16. The media processing device of claim 15, further comprising:
an audio dispatcher electrically coupled to the processing module to receive the audio data; and
a storage unit electrically coupled to the processing module and the audio dispatcher, and configured to store the position parameter, wherein the at least one broadcasting device comprises a first broadcasting device and a second broadcasting device, the at least one position parameter comprises a first position parameter corresponding to the first broadcasting device and a second position parameter corresponding to the second broadcasting device, the audio dispatcher obtains a first channel audio signal and a second channel audio signal from the audio data according to the first position parameter and the second position parameter, the processing module transmits the first channel audio signal to the first broadcasting device and transmits the second channel audio signal to the second broadcasting device.

17. The media processing device of claim 16, further comprising:
a control unit electrically coupled to the processing module, and configured to receive the at least one position parameter.

18. The media processing device of claim 16, further comprising:
a video dispatcher electrically coupled to the processing module and the storage unit, and comprising a video data, wherein the video dispatcher obtains a first position video signal and a second position video signal from the video data according to the first position parameter and the second position parameter, so that the processing module transmits the first position video signal to the first broadcasting device and transmits the second position video signal to the second broadcasting device.

19. The media processing device of claim 16, wherein the processing module further comprises:
a decode module configured to receive the media, and configured to transmit the audio data of the media to the audio dispatcher; and
a encode module electrically coupled to the audio dispatcher, and configured to receive the first channel audio signal and the second channel audio signal.

20. The media processing device of claim 16, wherein the output port is further electrically coupled to a third broadcasting device, wherein the third broadcasting device is arranged between the first broadcasting device and the second broadcasting device; the storage unit is further configured to store a third position parameter corresponding to the position parameter, the audio dispatcher obtains a subwoofer audio signal from the audio data according to the third position parameter, so that the processing module transmits the subwoofer audio signal to the third broadcasting device.

21. The media processing device of claim 16, wherein output port is further electrically coupled to a third broadcasting device, wherein the third broadcasting device is arranged between the first broadcasting device and the second broadcasting device; the storage unit is further configured to store a third position parameter corresponding to the position parameter; when the processing module transmits the first channel audio signal to the first broadcasting device, and transmits the second channel audio signal to the second broadcasting device, the processing module is further configured to turn off a speaker in the third broadcasting device.

22. The media processing device of claim 16, wherein output port is further electrically coupled to a third broadcasting device, wherein the third broadcasting device is arranged between the first broadcasting device and the second broadcasting device; the storage unit is further configured to store a third position parameter corresponding to the position parameter; the third broadcasting device comprises a first channel speaker and a second channel speaker, the processing module is configured to transmit the first channel audio signal to the first channel speaker, and is configured to transmit the second channel audio signal to the second channel speaker.

23. The media processing device of claim 16, wherein output port is further electrically coupled to a fourth broadcasting device and a fifth broadcasting device, wherein the fourth broadcasting device and the fifth broadcasting device are arranged between the first broadcasting device and the second broadcasting device, the fourth broadcasting device is adjacent to the first broadcasting device, the fifth broadcasting device is adjacent to the second broadcasting device, the fourth broadcasting device comprises a third channel speaker and a fourth channel speaker, the fifth broadcasting device comprises a fifth channel speaker and a sixth channel speaker; the processing module is configured to transmit the first channel audio signal to the third channel speaker, and transmit the second channel audio signal to the fifth channel speaker; the processing module is further configured to transmit a subwoofer audio signal to the fourth channel speaker and the sixth channel speaker.

24. The media processing device of claim 16, wherein output port is further electrically coupled to a fourth broadcasting device and a fifth broadcasting device, wherein the fourth broadcasting device and the fifth broadcasting device are arranged between the first broadcasting device and the second broadcasting device, the fourth broadcasting device is adjacent to the first broadcasting device, the fifth broadcasting device is adjacent to the second broadcasting device, the fourth broadcasting device comprises a third channel speaker and a fourth channel speaker, the fifth broadcasting device comprises a fifth channel speaker and a sixth channel speaker; the processing module is configured to transmit the first channel audio signal to the third channel speaker, and turn off the fourth channel speaker; the processing module is further configured to transmit the second channel audio signal to the fifth channel speaker, and turn off the sixth channel speaker.

* * * * *